United States Patent [19]

Wyner et al.

[11] 4,241,276
[45] Dec. 23, 1980

[54] WARM COLOR ARC DISCHARGE LAMP HAVING IMPROVED EFFICIENCY

[75] Inventors: Elliot F. Wyner, Peabody, Mass.; Alan J. Daignault, Londonderry, N.H.

[73] Assignee: GTE Products Corporation, Stamford, Conn.

[21] Appl. No.: 50,353

[22] Filed: Jun. 20, 1979

[51] Int. Cl.³ .................................... H01J 61/44
[52] U.S. Cl. ............................................ 313/487
[58] Field of Search ........................ 313/487, 486

[56] References Cited

U.S. PATENT DOCUMENTS 4,034,257  7/1977  Hoffman .

Primary Examiner—Palmer C. Demeo
Assistant Examiner—Darwin R. Hostetter
Attorney, Agent, or Firm—James Theodosopoulos

[57] ABSTRACT

A high pressure arc discharge lamp has a blended phosphor coating of about 35–40% cerium activated yttrium aluminate and 60–65% europium activated yttrium vanadate on the inner wall of the outer jacket.

2 Claims, 1 Drawing Figure

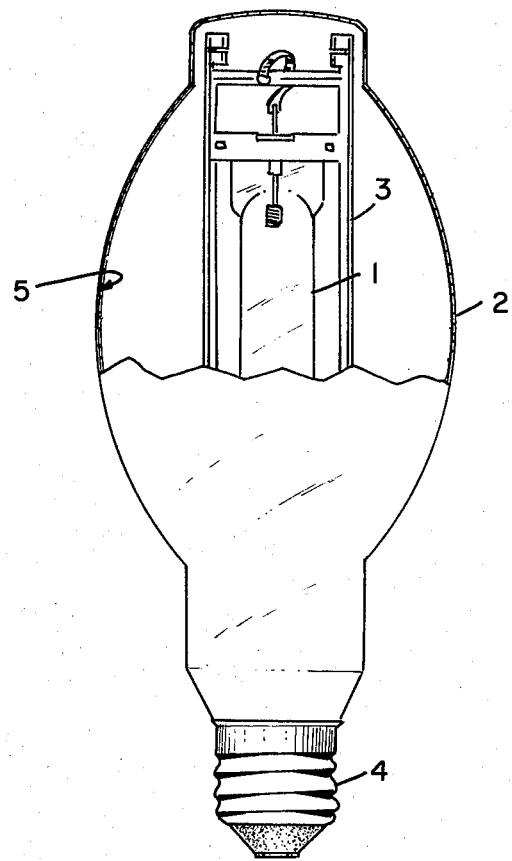

WARM COLOR ARC DISCHARGE LAMP HAVING IMPROVED EFFICIENCY

THE INVENTION

This invention is concerned with warm color high pressure arc discharge lamps containing mercury, such as are disclosed in U.S. Pat. Nos. 3,825,792 and 4,034,257. Such lamps comprise a mercury-containing arc tube disposed within an outer jacket, the inner wall of the outer jacket having a phosphor coating thereon which provides the desired warm color. This invention is particularly concerned with providing a lamp that is more efficient (in terms of lumens per watt) than prior art warm color lamps. Improved efficiency is especially desirable in these times of national concern with energy conservation.

The lamp disclosed in U.S. Pat. No. 4,034,257 comprises a phosphor of cerium activated yttrium aluminate blended with europium activated yttrium vanadate or vanadate phosphate. The patent discloses that color rendition can be improved without significant reduction in lamp lumen output by blending 5 to 30% of the cerium activated phosphor with the europium activated phosphor.

We have found that in order to obtain a warm color lamp having maximum efficiency, about 35 to 40% of the cerium activated yttrium aluminate must be blended with europium activated yttrium vanadate, warm color lamps being considered to be those having a correlated color temperature of about 3300° K. to 3500° K.

The drawing, partly in section, shows a high pressure mercury vapor lamp in accordance with this invention.

The lamp is of the usual construction and comprises a mercury-containing arc tube 1 within a glass outer jacket 2. Arc tube 1 contains an inert starting gas and may also contain a metal halide. The arc tube is supported in the usual arc tube mount 3 and has the usual electrical connections to a base 4. The inner wall of jacket 2 has a phosphor coating 5 as per this invention. Phosphor coating 5 comprises a blend of cerium activated yttrium aluminate and europium activated yttrium vanadate, the aluminate being about 35–40% of the total weight of the two phosphors.

In a preferred embodiment, 400 watt BT37 lamps were made in which phosphor coating 5 comprised 35% cerium activated yttrium aluminate phosphor (Sylvania type 251) and 65% europium activated yttrium vanadate phosphor (Sylvania type 2390). The weight of phosphor coating 5 on jacket 2 was 1.7 grams. The 100 hour output of the lamp was 23,500 lumens, an efficiency of 58.8 lumens per watt. The color temperature was 3340° K. and the x,y chromaticity coordinates were 0.427, 0.424.

In another similar 400 watt BT37 embodiment, the weight of phosphor coating 5 was 1.8 grams and its composition was 40% cerium activated yttrium aluminate, 60% europium activated yttrium vanadate. The 100 hour output of the lamp was 23,100 lumens, an efficiency of 57.8 lumens per watt. The color temperature was 3353° K. and the x,y chromaticity coordinates were 0.423, 0.416.

At a composition of 50% cerium activated yttrium aluminate, 50% europium activated yttrium vanadate, the 100 hour output was only 22,400 lumens, an efficiency of 56 lumens per watt. The color temperature was 3644° K. which is outside the desired warm color range.

We claim:

1. A high pressure arc discharge lamp comprising a mercury-containing arc tube disposed within an outer jacket, the outer jacket having a phosphor coating on the inner wall thereof, the phosphor coating comprising about 35 to 40% of cerium activated yttrium aluminate and 60 to 65% of europium activated yttrium vanadate.

2. The lamp of claim 1 wherein the color temperature of the light emitted by the lamp is about 3300° to 3500° K.

* * * * *